9566X
N. HUNGERFORD.
Carriage-Spring.
Patented Mar. 31, 1836.
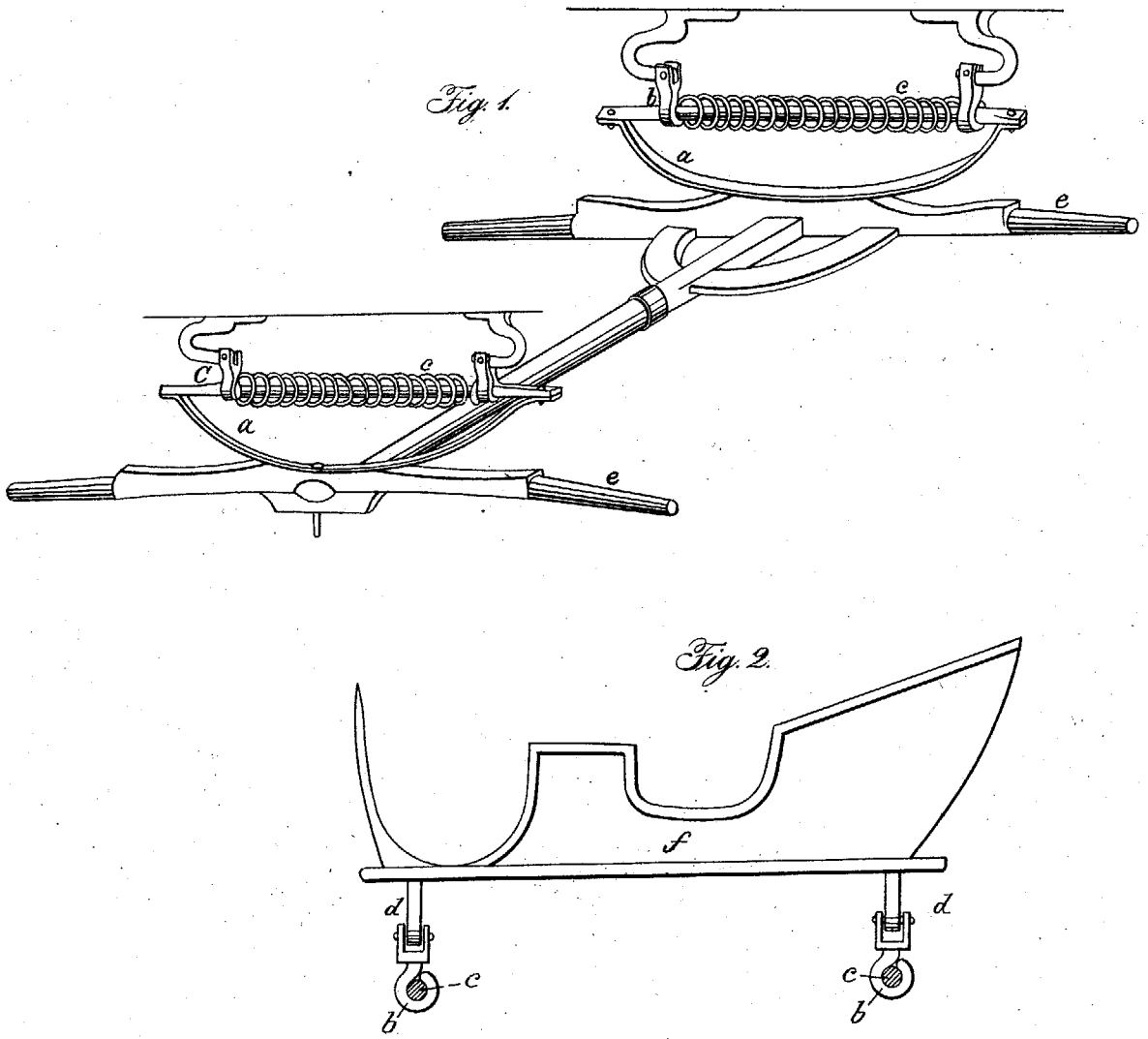
AM. PHOTO-LITHO. CO. N.Y. (OSBORNE'S PROCESS.)

9566X Mar 31, 1836 2/9

Newell Hungerford, of Ithaca N. York.
Letters Patent

The schedule referred to in these Letters Patent and making part of the same, containing a description in the words of the said Newell Hungerford himself, of his improvement" in Waggon and carriage Springs":

---

To all whom these presents shall come; Be it known that I Newell Hungerford of Ithaca in the County of Tompkins and State of New York, have invented a new and useful improvement in Springs for waggons, carriages and coaches, called the spiral carriage spring, and that the following is a full and exact description of the construction and operation of the said invention as invented or improved by me. A piece of iron or steel three feet long or more or less, according to the width of the conveyance, upon which it is placed is fastened firmly upon the hind and forward axle-trees of the waggon or carriage with iron bolts - across the top of this piece of iron (which is in the form of a half eliptick) is placed an iron bar made of round iron, fastened to the ends of the half eliptick, by iron bolts, and is called the spring bar. Around the spring bar is placed a spiral spring made of steel, and which may be either of a flat or round shape, and which is fastened to the spring bar by bolts of iron - upon the bottom of the box or body of the carriage is placed four pieces of iron rivetted to the bottom, called body-loops or goose necks of different lengths according to the size of the carriage, at the end of the body loop or goose neck next to the spring bar, is an eye also at the end of the shank of the spring is an eye, made of iron or steel, from one eye to the other leads a shackle with a bolt of iron through or into each eye fastened with a nut, so as to connect the body of the carriage with the spring —

Witnesses Newell Hungerford

Frederick G. Stanley

Sam. Crittenden Jr.

354 × 80]

Exd.
M.G.C.